United States Patent [19]
Hopkins

[11] 4,081,090
[45] Mar. 28, 1978

[54] IMPLEMENT TRANSPORTATION TRAIN

[76] Inventor: David L. Hopkins, Rte 1, Box 35B, Williams, Ariz. 80646

[21] Appl. No.: 769,689

[22] Filed: Feb. 17, 1977

[51] Int. Cl.² .............................................. B65G 67/02
[52] U.S. Cl. ................................. 214/38 R; 280/402; 280/79.1 R
[58] Field of Search ............................ 214/38 R, 152; 280/79.1 R, 79.1 A, 639, 47.13 R, 402, 476 R

[56] References Cited

U.S. PATENT DOCUMENTS

| | | | |
|---|---|---|---|
| 2,541,582 | 2/1951 | Hawkins | 280/402 |
| 2,639,926 | 5/1953 | Parks | 280/402 |
| 2,943,863 | 7/1960 | Corey et al. | 280/47.13 R |
| 3,311,245 | 3/1967 | Galey | 280/402 |
| 3,653,680 | 4/1972 | Denny | 214/85.1 |

Primary Examiner—Albert J. Makay
Assistant Examiner—Lawrence E. Williams
Attorney, Agent, or Firm—Emmette R. Holman

[57] ABSTRACT

A method and train is disclosed for the highway safe transportation of a front loader implement, i.e., a back hoe or a skip loader, with the rear pair of wheels of same cradled above road level between the front and rear axles of a dolly and with the front lip of the scoop of the implement engaging a rearwardly-directed lip hook provided at the fork of a Y-shaped towbar. The two arms of said towbar extend rearwardly under the scoop, each arm with a length of chain and a terminal hook threaded under and behind the scoop, over the lift arms and there secured, each chain to the other, by means of its terminal hook. The forward-directed base of the Y is provided at its terminus with a trailer coupler engaging the trailer hitch of a towing vehicle. The front pair of wheels of the implement are raised above road level by downwardly uncurling the scoop. As an option the dolly is provided with a pair of automatically retractable ramps hingeably attached near their rearward ends to the front axle and each ramp is provided at its forward-directed end with a length of chain with a terminal hook, whereby to secure the ramp in the retracted position. Means are disclosed for locking the articulation, in order to prevent descent to road level while being towed, of the scoop and towbar assembly, of the front wheels of the implement, and of the ramps, respectively.

20 Claims, 12 Drawing Figures

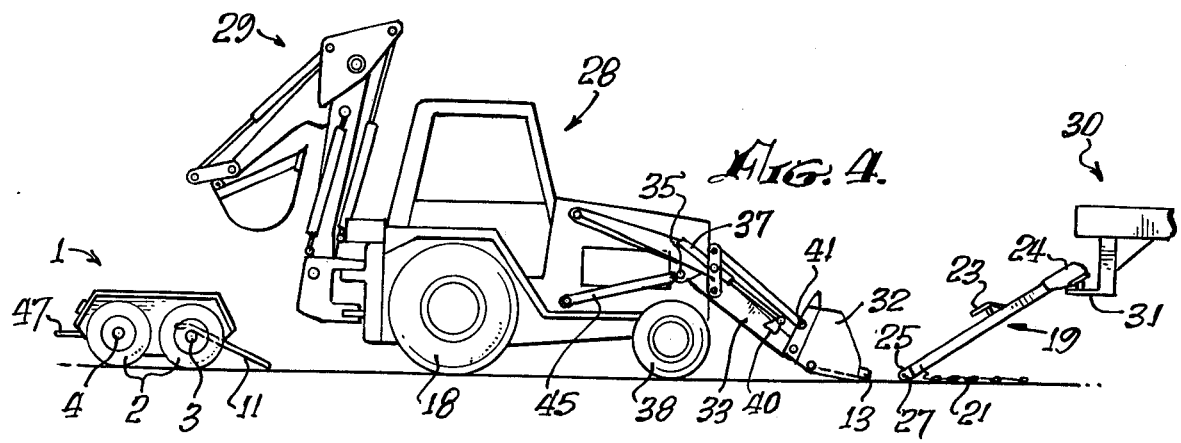

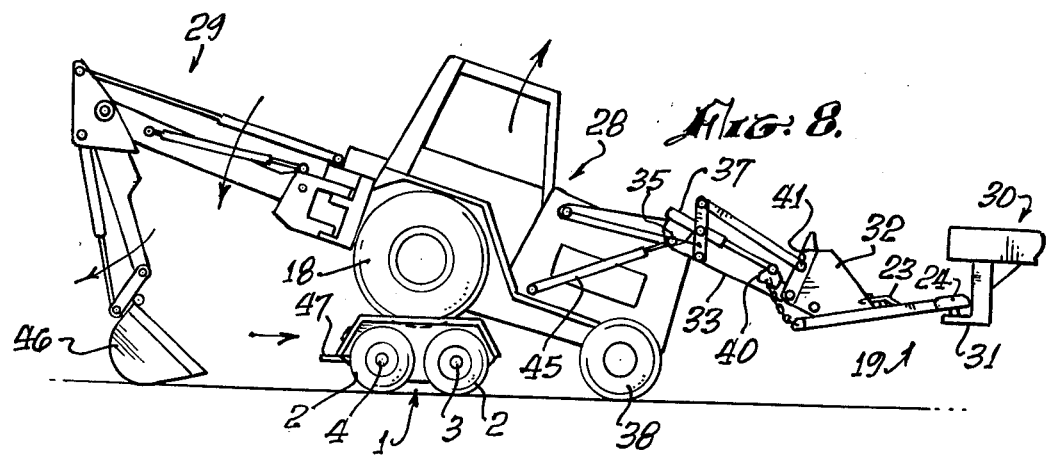
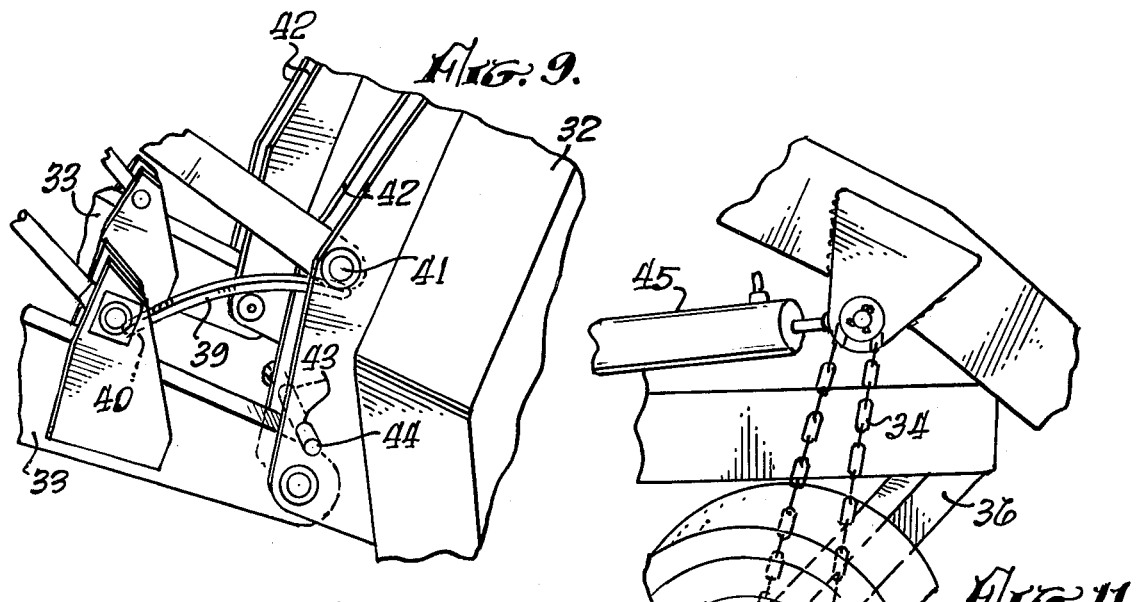
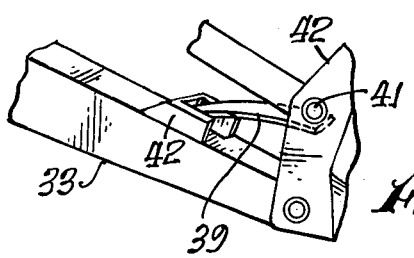
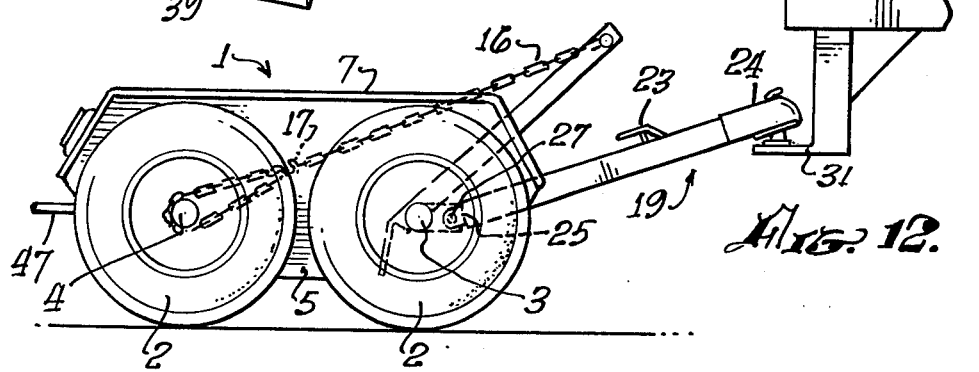

IMPLEMENT TRANSPORTATION TRAIN

BACKGROUND OF THE INVENTION

This invention concerns a method and a train for the highway safe transportation of a front loader implement, i.e., a back hoe or a skip loader. Such implements, for the purpose of this invention, are characterized by having a front loading scoop, hence the term "front loader" in common usage in the art. In addition, they are characterized by having a rear pair of drive wheels which are relatively large in diameter and a pair of steerable front wheels which are considerably smaller in diameter. They are four-wheeled implements in contrast to corresponding implements that travel on a pair of bands of articulated plates, i.e., on caterpillar tracks, with which latter type of implement this invention is not concerned.

In the present state of the art the front loader implement is transported on the flat bed of a trailer, preferably on a tilt bed trailer. The trailer necessarily is considerably longer and wider than the implement and has a longer wheelbase. When the implement is delivered to a worksite, the trailer is parked on the roadway, curbside, as close as possible to the worksite, and the implement is driven the rest of the way on its own power. Curbside parking space which is sometimes scarce at a worksite is tied up with the idle trailer for the duration of the job. The trailers are large, cumbersome, heavy and expensive. They are difficult to maneuver in tight places and expensive to haul. They are a traffic hazard when parked curbside overnight without lights.

In U.S. Pat. No. 2,794,565 dated Apr. 14, 1955, Lawrence S. Ratliff proposed a two-wheeled trailer for carrying the rear end of a heavy implement with caterpillar tracks while the front end, riding on an adapter chassis, is carried on the fifth wheel of a towing vehicle. The towed implement itself is a participating member of the transport train. This is the only example in the prior art of which I am aware where the implement is a participating member of the train.

In U.S. Pat. No. 3,510,016 dated May 5, 1970 William H. Wolff, et al disclosed an automobile towing trailer which has four non-steerable wheels on a chassis to which is rigidly attached a tongue on the terminus of which is a trailer coupler provided for engaging the ball of a trailer hitch on the towing vehicle. The rear wheels of the automobile are cradled in a shallow V-shaped notch in the chassis above the level of the axles. The front wheels of the automobile trail behind. In the towing mode, the front wheels remain in contact with the road.

In U.S. Pat. No. 3,653,680 issued to Donald I. Denny on Apr. 4, 1972 there is disclosed a four-wheeled trailer with tongue and trailer coupler which is adapted for the towing of an automobile. The front wheels of the trailer are provided with steering knuckles and king pins and are steerable. The rear wheels are mounted on casters free to rotate 360° and they are considerably smaller in diameter. A foldable platform is interposed between the front and rear wheels of the trailer on which are carried the rear wheels of the towed automobile, leaving the front wheels thereof trailing and in contact with the road. The level of the platform is somewhat higher than the top of the front axle of the trailer. The feature of this invention is that the platform can be folded back over the front axle permitting it to be towed on two wheels instead of four when empty. A pair of removable ramps are provided, including means to hook one end of each ramp into a slot located in the trailing edge of the platform. After the automobile has been drawn up into position on the platform the ramps are manually removed and stored in a tray provided on the trailer.

The devices of the aforementioned U.S. Pat. Nos. 3,510,016 and 3,653,680 are trailers. They have all of the disadvantages that have already been attributed to trailers in the foregoing discussion.

I have found that the above mentioned disadvantages can be minimized or avoided in an implement transportation train consisting of a light, compact four wheel dolly carrying the implement with its large rear drive wheels cradled between the front and rear axles of the dolly.

In lieu of a trailer tongue I utilize the foremost projecting member of the towed implement namely, the lip of the scoop. The lip of the scoop engages a rearwardly directed lip hook provided at the fork of a Y-form towbar, the two arms of the Y being rearwardly directed under the scoop. A length of chain with terminal hook extends from the end of each of said arms, each said chain on its respective side of the Y being threaded under and behind the scoop over the lift arm on its respective side. The two chains are there tightly secured each to the other by their terminal hooks. The base of the Y-form towbar is provided at its forward-directed terminus with a conventional trailer coupler engaging the ball of a trailer hitch of a towing vehicle.

It is an object of the invention to provide an implement transportation train that is only slightly longer than the combined lengths of the implement and the towing vehicle and the overpass vertical clearance of which is only about 10 inches taller than the height of the implement when standing on the ground.

It is another object of the invention to provide an implement transportation train that is based on a four-wheeled dolly that is compact and light enough to be maneuvered into tight places like a hand truck so that said dolly can be pushed off the roadway by hand and parked while idle.

It is a third object of the invention to provide an implement transportation train in which the towed implement is carried with all four wheels above ground at a minimum clearance above road level that is consistent with good highway safety practice, thereby maintaining a low center of gravity and consequently, maximum stability on turns and deceleration.

It is a fourth object of the invention to provide optional automatically retractable ramps to permit the mounting or dismounting of the implement onto or from the dolly under its own power.

It is a fifth object of the invention to provide towbar means safely secured to the front loader scoop, whereby the towed implement becomes an actively participating member of the transportation train.

It is a sixth object of the invention to provide highway safe locking means, in the event of leakage in the hydraulic system or accidental tripping of the controls, to prevent the lowering of the scoop and towbar assembly, or of the front wheels of the implement, or of the retractable ramps while the implement is being towed.

BRIEF DESCRIPTION OF THE DRAWINGS

FIGS. 4 to 7, inclusive, are side views of the members of the implement transportation train with towing vehicle in fragmentary view illustrating the sequential steps in assembling the train.

FIG. 8 is a side view similar to that shown in FIG. 6 illustrating an alternative method for mounting a backhoe on the dolly without the use of ramps.

FIG. 9 is a fragmentary view in perspective showing two alternative methods for locking the curling linkage of the scoop, one with a bar of spring steel, the other with a bolt, to prevent the lowering of the scoop and towbar assembly while being towed.

FIG. 10 is a fragmentary view in perspective similar to FIG. 9 showing a weldment added on top of the lift arm to provide a concave point of purchase for the steel spring bar of FIG. 9.

FIG. 11 is a fragmentary view in perspective showing a method for tying the lift arm pin extension and the front axle of the implement together with a chain to prevent the lowering of the front wheels while being towed.

FIG. 12 is a side view of the dolly similar to FIG. 3 showing engagement of the forward-directed terminus of the towbar to the trailer hitch of the towing vehicle, shown in fragmentary view, and of the rearwardly-directed arms of the towbar engaged with bolts to dual tabs on the front axle of the dolly, illustrating the road-ready arrangement of the ramps and towbar linkage to the dolly when empty.

DETAILED DISCUSSION

Figure 1:
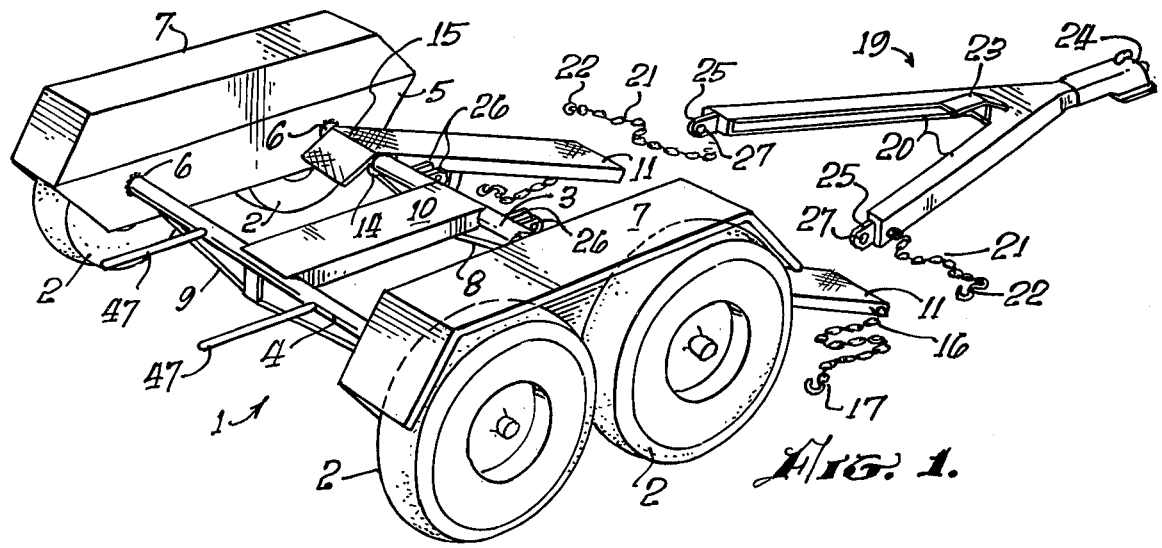
FIG. 1 is a view in perspective from the right rear of the dolly showing the ramps lowered and the Y-form towbar lying in front of the dolly.
Figure 2:
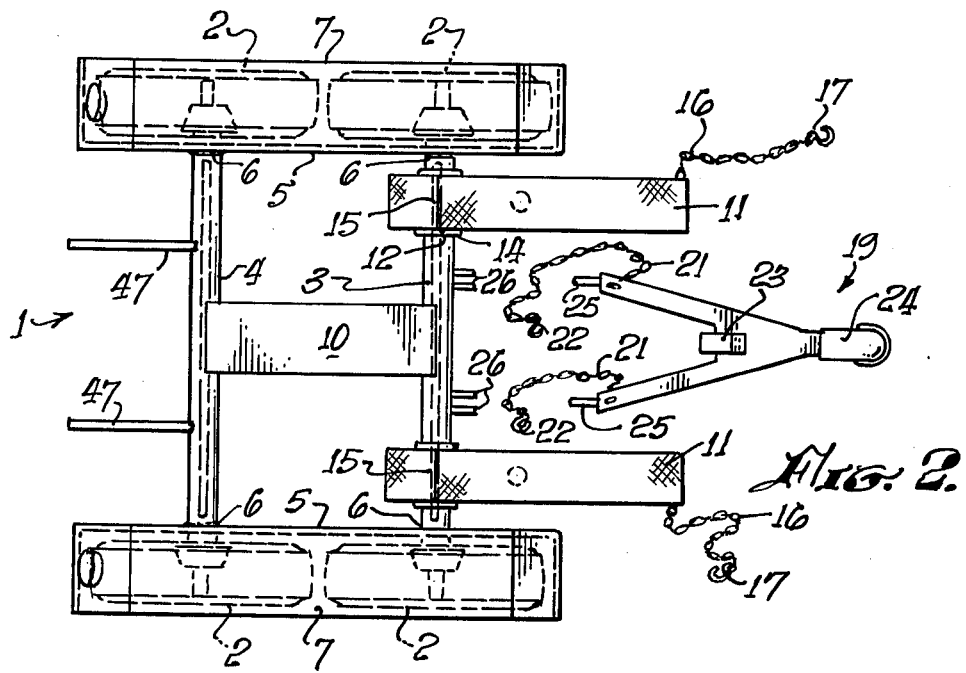
FIG. 2 is a plan view of the combination depicted in FIG. 1.
Figure 3:
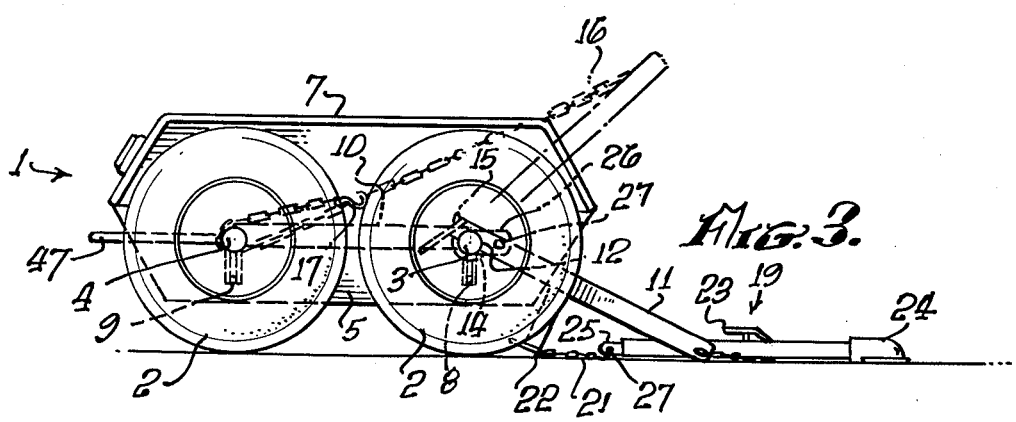
FIG. 3 is a side view of the combination depicted in FIG. 1 showing in phantom view the road-ready position of the ramp when empty.

Referring now to FIGS. 1, 2 and 3, the dolly, generally shown as 1 is carried on four wheels, 2, mounted on front and rear axles, 3 and 4, respectively, having an outside diameter of about 3 inches. The axles are rigidly held in proper alignment parallel to each other and spaced about 27 inches apart by heavy steel sideboard plates, 5, about ¼ inch in thickness, to which they are welded at their junctions, 6. This interaxial spacing is preferred for the 48 inches outside diameter tires most commonly used on the rear wheels of front loaders, but the spacing should be increased or decreased in proportion to the outside diameter of the tire if different from 48 inches. When the preferred 7.50 × 14.5 size of tire on the dolly is used this provides a minimum road clearance of about 10 inches with all tires properly inflated.

Depending on the width of the implement to be transported the sideboards, 5, are spaced from about 57 inches to about 83 inches apart. The fenders, 7, may optionally be added to the sideboards to enclose each set of tandem wheel wells. The fenders, typically are constructed of lighter stock, e.g., of 16 gauge steel.

To reduce vertical flexing under the weight of the heavy implement, typically about 8,000 to 10,000 lbs., the axles are reinforced by heavy steel struts 8 and 9 stretched beneath the front and rear axles 3 and 4, repsectively. Likewise, to reduce horizontal flexing these axles are reinforced by bridging their middle portions together with a heavy steel member, 10, which may be of channel beam construction welded therebetween.

Two retractable ramps, 11, of channel beam construction, are hingeably engaged at 12 to the front axle 3. When the dolly is to be used exclusively for the transport of a backhoe these ramps may optionally be dispensed with, but they are indispensable for transporting skip loaders, as will be explained later.

Three alternatives are possible: (a) without ramps, (b) with easily removable ramps, and (c) with non-removable ramps. Alternative (a) requires no further elaboration. In alternative (b) as depicted for example in FIG. 12 the ramp is simply hooked over the axle and hence can simply be lifted off when not needed. In alternative (c) as depicted in FIGS. 1 and 3 the ramp is hingeably secured to the axle by holding means 14, which may be a U-bolt welded to each side of the ramp. It may also be a U-bolt threaded from below through a pair of corresponding holes in the ramp and secured thereto by nuts topside of the ramp. The latter example may be said to represent a type that actually falls somewhere between the extremes of alternatives (b) and (c).

Whenever ramps are used, it is essential for the best practice of this invention that the ramps automatically retract from the ground as the wheels 18 of the implement descend between the axles 3 and 4 of the dolly. Automatic retraction is achieved, according to the invention, by the passage of the wheel 18 of the implement over top dead center of the front axle 3. As best shown in FIG. 3, the plane of the long run of ramp 11 extends slightly past top dead center of the axle 3 to the edge designated as 15. At the moment when the implement wheel 18 reaches top dead center over the axle 3, i.e., when the axis of wheel 18 is precisely on a vertical line over the axis of axle 3, the plane of the ramp will tend to assume a horizontal position, or more generally stated, the ramp tends to maintain an orientation perpendicular to a line connecting the centers of wheel 18 and axle 3. As wheel 18 continues toward edge 15 the free end of the ramp continues to rise until at edge 15 wheel 18 drops into the interaxial cradle rest position. In the cradled position of wheel 18 the ramp assumes an elevated orientation of from about 30° to about 60° from the horizontal in consequence of the abrupt downward turn of the ramp at edge 15 sweeping an angle of from about 30° to about 60°. Edge 15 divides the ramp into a long run of about 46 inches and a short run of about 6 inches. It is located about 1½ inches rearward from a normal to the top surface of the long run drawn from the axis of axle 3.

The free end of the long run of each ramp 11 is provided with a length of chain 16 with a terminal hook 17 by means of which the ramp is locked at a highway-safe level above the road by securing the chain to any convenient structural member of the implement being transported. In the event that the dolly is to be towed empty the chain 16 is secured, preferably, around the rear axle 4 (See FIG. 12) and in this case the long run of the ramp may be upwardly oriented to as much as about 85° from the horizontal.

The Y-form towbar generally indicated as 19 is provided at the end of each of its rearward-directed arms 20 with a length of chain 21 with a terminal hook 22, at the fork of the Y with a rearward-directed lip hook 23, and at the forward-directed terminus of the base of the Y with a trailer coupler 24. In addition, a tab 25 is provided at the end of each rearward-directed arm 20. The tab 25 is designed to fit cooperatively between forward-directed dual tabs 26 welded on the axle 3. Each cooperating trio of tabs is perforated with a hole 27 adapted to receive a bolt, whereby the towbar may be coupled to the dolly through a pair of hinged couplings.

The procedure for loading the implement, generally indicated as 28 is illustrated in FIGS. 4 to 8, inclusive. When the implement has a backhoe assembly, 29, it is known as a backhoe and in the absence of assembly 29 it is known as a skip loader. The members of the transport train, i.e., the dolly 1, the implement 28, the towbar 19, and the towing vehicle 30 (shown only in fragmentary view) are lined up respectively as shown in FIG. 4.

Sequence of Procedure:

a. The coupler 24 of the towbar 19 is secured to the ball (not shown) of the trailer hitch 31.

b. The implement 28 is advanced toward the towing vehicle 30, in the course of which the lip 13 of the front loader scoop 32 rides up the inclined towbar 19 until it engages the lip hook 23 of the towbar.

c. As shown in FIG. 5 the scoop and towbar assembly is raised at least about 2 feet above the ground. The two chains 21, each on its own side, are threaded under then upwardly behind scoop 32, over the lift arms 33, and there hooked each to the other by means of their terminal hooks 22. A portion comprising three of the four members of the train is thereby assembled.

d. As shown in FIG. 6 the dolly is maneuvered by hand until its lowered ramps 11 engage the rear wheels 18 of the implement and then the above-assembled portion of the train is backed up the ramps under the power of towing vehicle 30 until the wheels 18 of the implement drop into their cradle position between the axles 3 and 4.

e. As shown in FIG. 7 a length of chain 34 is wrapped over the projecting portion of an extra long replacement lift arm pin, 35, then under the front axle 36 of the implement and tightly secured as can be better seen in FIG. 11.

f. The bucket ram 37 of the implement is then actuated to uncurl the scoop 32 forward and downward. This exerts a downthrust on the trailer hitch by means of which the front wheels 38 are raised at least 10 inches off of the ground and preferably to the point where the towbar 19 is oriented horizontally.

g. A lock bar 39 of spring steel, e.g. a length of extra heavy truck leaf spring about 0.5 × 3 × 15 inches in size is inserted into the opposed concavities of the front side of the bucket ram link pin journal boss 40 on the lift arm 33 and that of the upper linkage pin 41 on the dual scoop-supporting webs 42, whereby the curling of the scoop, as measured by the diminished distance between boss 40 and pin 41 is prevented from diminishing under said 15 inches, and the scoop and towbar assembly is prevented from descending, at worst, to road level. This is shown in greater detail in FIG. 9.

The design and dimensions of the linkage differs between makes and even between models of the same make of implement. Consequently the dimensions of the spring lock bar 39 will necessarily vary to meet each specific situation. In some cases it is necessary to create a concave receiving means at the desired location on the lift arm 33 within which the end of the bar 39 will find a point of purchase, as for example in the weldment 42 as depicted in FIG. 10.

Still another locking means for the scoop is also depicted in FIG. 9 for the purpose of this disclosure. It should be understood however that either lock affords ample protection of itself, that they are proposed alternatives of equal choice, and that it is not the intent to actually utilize both alternatives simultaneously as is depicted. The other locking means consists of a hole 43 through the dual supporting webs 42 of the scoop 32 adapted to receive a ⅝ inch bolt 44. The location of the hole is selected to barely clear the upper edge of the lift arm 33 when the scoop is oriented in the towing position. A ⅝ inch bolt at least 5 inches long is placed through the hole, whereby the scoop is safety-locked from curling in transport in the event of leakage in the hydraulic system or accidental tripping of the controls.

h. The ramp chains 16 are secured to any convenient overhead member of the implement 28. In FIG. 7 chain 16 is secured to the stationary end of the lift ram 45 while in FIG. 12 it is secured to rear axle 4 of the empty dolly.

i. The electrical harness leads for lights and brakes (not shown) are connected to the towing vehicle.

j. As an extra safety precaution, the rear axle of the implement 28 may be lashed down with chains around both front and rear axles 3 and 4 of the dolly. The implement transportation train is now road-ready and highway safe.

The backhoe is unique in being able to raise its rear wheels high into the air by exerting a downward thrust of the backhoe bucket into the ground as shown in FIG. 8. Although the retractable ramps may be utilized in the same way as has already been described for skip loaders, in the case of backhoes the ramps optionally can be dispensed with.

The sequence of procedure for assembling a backhoe transportation train without ramps is exactly the same as already outlined for same with ramps but with the exception of step (d). The following step (d') is substituted for (d).

d'. As shown in FIG. 8 the backhoe assembly 29 is opened and extended and the flat of the bucket is thrust to the ground at least 6 feet back of the rear wheels 18, preferably 8 to 10 feet back. The downthrust is continued until the rear wheels 18 are elevated sufficiently to clear the axle 3 of the dolly. At this point the dolly 1 is grasped by its handlebars 47 and is manually positioned and centered under the wheels 18. The implement is lowered until the wheels 18 are cradled between the axles 3 and 4 of the dolly and then the bucket and boom are raised, curled and folded into the travel configuration shown in FIGS. 3, 6 and 7.

In the dismounting of the implement from the dolly the procedure for mounting is reversed, except that steps (c) and (b), in that order, are undone before step (d) or (d') is undone. In the case of (d) the implement dismounts down the ramp under its own power after it has been separated from the towbar and the towing vehicle has been driven away.

I claim:

1. In a transport train adapted for the hauling of a self-propelled front-loading implement having as its foremost extending member a scoop operable in the curling mode at the distal ends of a pair of lift arms, one said arm on each side of said implement, each said arm replete with lift ram, bucket ram and ancillary linkages being duplicated on both sides of said implement, through linkages about an upper and a lower pin, both pins engaging the scoop through supporting dual webs in the rear wall thereof, said lower pin engaging a lift arm boss on said lift arm, a lift ram connected by a lift arm pin to said lift arm to hydraulically raise or lower said lift arm, said scoop having a lip along its forward edge, said implement being equipped with 2 pairs of wheels of which the rear pair are drive wheels, said implement being selected from the group consisting of back hoe and skip loader,
the combination of:
- a. a four-wheeled tandem dolly having front and rear transverse axles;
- b. said front-loading implement with said rear pair of drive wheels being supportably cradled between said front and rear transverse axles of said dolly in a position elevated above ground level;
- c. a Y-form towbar;
- d. the lip of said scoop of said implement engaging a rearwardly-directed lip hook provided at the fork of said Y-form towbar, the two arms of the Y being rearwardly directed under said scoop;
- e. a length of chain with terminal hook extending from the end of each of said arms of the Y, each said chain on its respective side of the Y being threaded under and behind said scoop, over said lift arm behind said lower pin on its respective side, the chains being tightly secured each to the other by said terminal hooks;
- f. the base of said Y-form towbar being provided at its forward-directed terminus with a conventional trailer coupler;
- g. said coupler engaging a ball hitch provided as the rearmost extending member of a towing vehicle; and
- h. the pair of front wheels of said implement being raised above ground;

whereby the train is road-ready for transport of the implement as a participating member of the train under the power of the towing vehicle.

2. The combination of claim 1 wherein the dolly further includes sideboards affixed to the ends of said front and rear transverse axles whereby said axles are held in alignment perpendicular thereto and separated a distance from each other selected to maintain a road height clearance of said pair of drive wheels supportably cradled therebetween in an elevated position of at least about 6 inches.

3. The dolly according to claim 2 wherein said road height clearance is at least about 10 inches.

4. The dolly according to claim 2 wherein said transverse axles are separated a distance of about 27 inches between centers to accommodate drive wheels of about 48 inches outside diameter.

5. The dolly according to claim 2 wherein said transverse axles have an outside diameter of about 3 inches.

6. The dolly according to claim 2 wherein said sideboards are constructed by welding of steel plates, having a thickness of about ¼ inch, directly to the ends of said front and rear transverse axis.

7. The dolly according to claim 6 wherein said sideboards are spaced from about 57 inches to about 83 inches apart.

8. The dolly according to claim 7 wherein each said front and rear transverse axle is reinforced against vertical bending by a strut stretched beneath it.

9. The dolly according to claim 8 wherein said front and rear transverse axles are reinforced against horizontal bending failure by briding the middle portions of said axles together with a steel member welded therebetween.

10. The dolly according to claim 9 wherein said steel member is of channel beam construction.

11. The dolly according to claim 10 having fenders affixed to each of said sideboards to provide a wheel well for each set of tandem wheels.

12. The dolly according to claim 11 having a pair of retractable ramps hingeably attached adjacent to their rearward-directed ends to the front transverse axle.

13. The dolly according to claim 12 wherein each of said retractable ramps is provided at its forward-directed end with a length of chain with a terminal hook, whereby to secure the ramp in the retracted position by tying said chain to the lift ram on its respective side of said implement.

14. The dolly according to claim 12 wherein the top surface of each of said retractable ramps is divided by a line into a forward-directed long run and a rearward-directed short run, wherein said line is located about 1½ inches rearward from a normal to the top surface of said long run drawn from the axis of said front transverse axle.

15. The dolly according to claim 14 wherein the topface of said short run is downwardly inclined from the top face of the long run by an angle of from about 30° to about 60°.

16. The dolly according to claim 14 wherein said long run is about 46 inches long and said short run is about 6 inches long.

17. The dolly according to claim 11 wherein said rear axle is equipped with a pair of horizontal, rearward-directed steel rods affixed thereon to provide a pair of handlebars for manual maneuvering of the dolly into position during the loading and unloading of the implement.

18. The combination of claim 1 wherein the base and arms of the Y-form towbar are of channel beam construction.

19. The Y-form towbar according to claim 18 wherein the base and arms of the Y are of box beam construction.

20. The Y-form towbar according to claim 18 wherein the base and arms of the Y are of I-beam construction.

* * * * *